United States Patent [19]

Rogers et al.

[11] 3,939,746

[45] Feb. 24, 1976

[54] SAW GUARD

[75] Inventors: Gary W. Rogers, Aloha; Leroy A. Tottie, Aberdeen; Vaughn G. Hamilton; Orville O. Goodwin, both of Pacific Beach; Jean A. Baker, Hoquiam, all of Wash.

[73] Assignee: Evans Products Company, Portland, Oreg.

[22] Filed: Oct. 16, 1974

[21] Appl. No.: 515,189

[52] U.S. Cl. .................... 83/544; 83/440.2; 83/478
[51] Int. Cl.$^2$ .................... B27G 19/02; B23D 59/00
[58] Field of Search .......... 83/544, 397, 397.1, 398, 83/478, 440.1, 860

[56] References Cited

UNITED STATES PATENTS 2,637,353 5/1953 Hyslop, Jr. ........................ 83/544 X
3,848,502 11/1974 O'Neill ............................ 83/544 X

*Primary Examiner*—Willie G. Abercrombie
*Attorney, Agent, or Firm*—Robert E. Howard

[57] ABSTRACT

A saw guard for a circular saw having a saw blade and a work piece holder which moves relative to the saw blade to cut the work piece, the saw guard being mounted on the leading edge of the work piece holder and having means for moving the saw guard into a shielding position adjacent the cutting edge of the saw blade while the work piece holder is in a restocking cycle.

5 Claims, 4 Drawing Figures

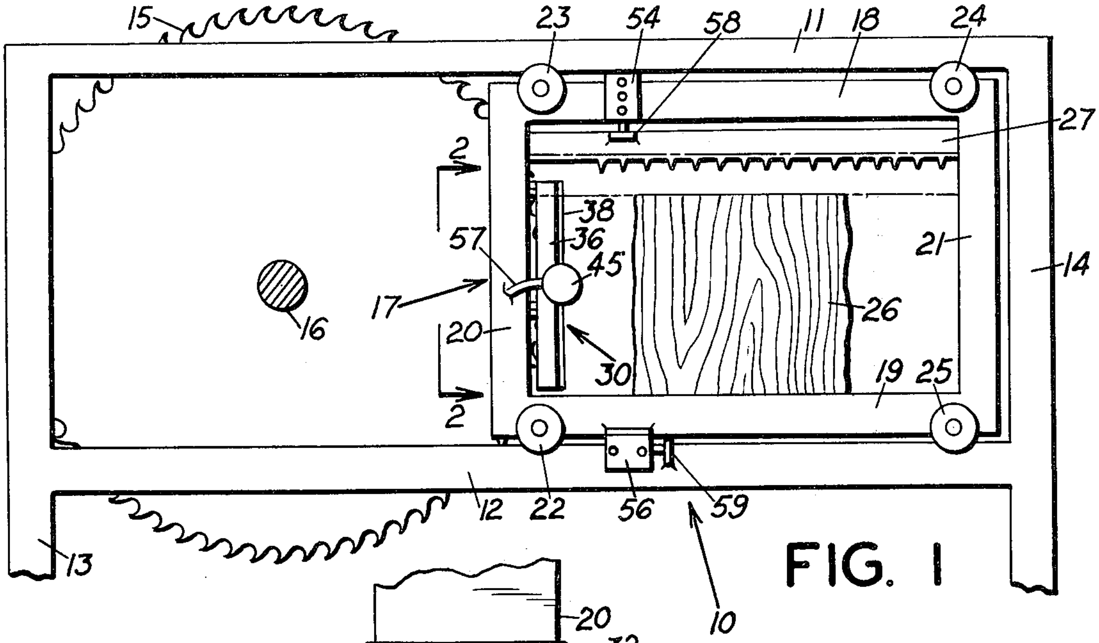
FIG. 1
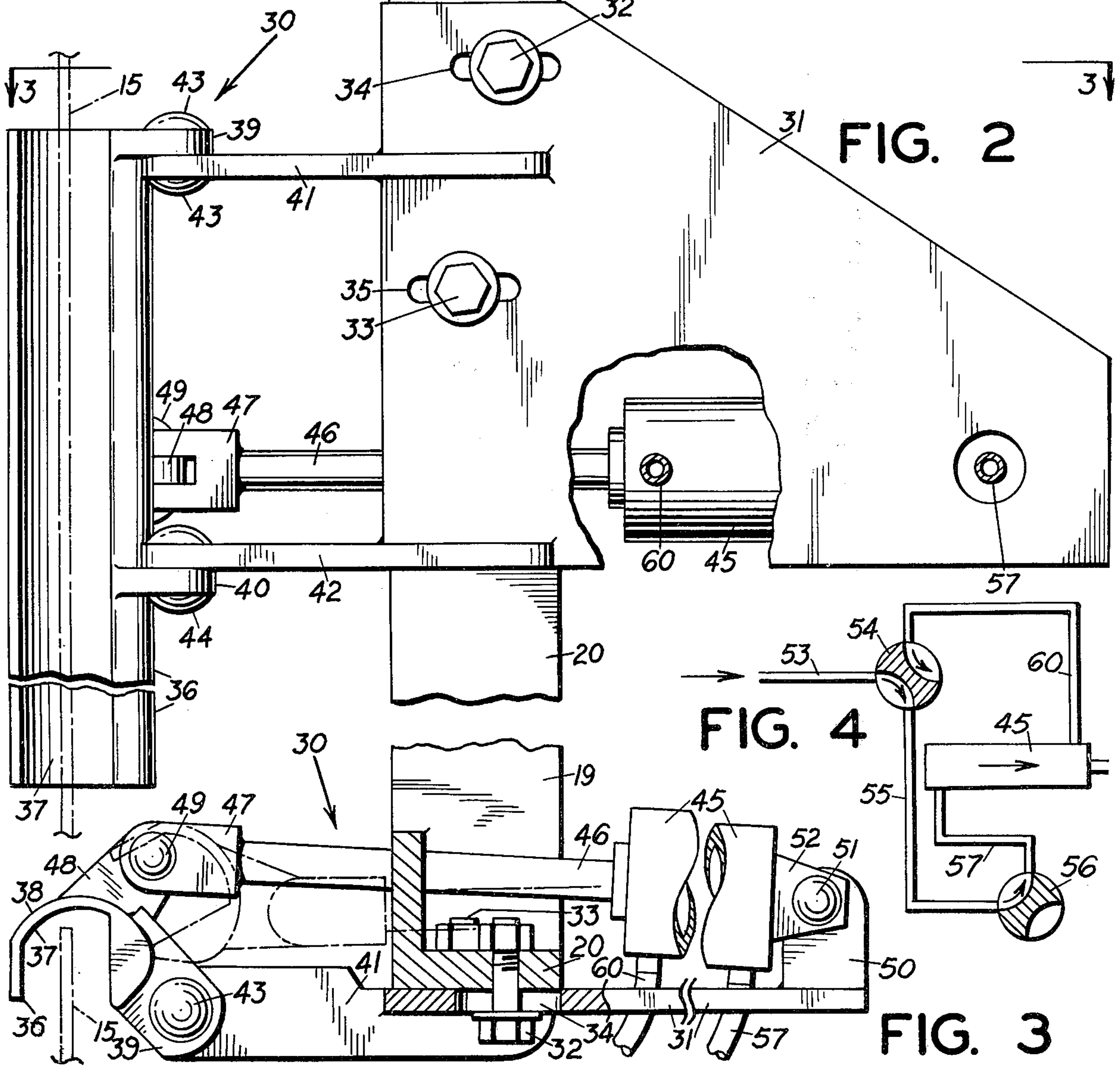
FIG. 2
FIG. 3
FIG. 4

SAW GUARD

BACKGROUND OF THE INVENTION

The use of saw guards on power driven saws is almost as old as the power driven saw itself. Over the years many proposals have been made for various types of guards to prevent the operator from accidentally coming into contact with the saw blade which can result in serious injury.

However, some saws, due to the nature of the work being performed thereupon, have appeared to elude easy solution with regard to the guarding problem. One such saw is a circular saw employed in the shingle industry. Basically, this shingle saw is comprised of a large power driven circular saw, and a work piece holder which moves the work piece relative to the saw to cut the work piece into thin shingles. In operation the operator is required to insert a fresh work piece which, in the case of the shingle saw, is a block of cedar wood, at such a location that one hand and arm are exposed to the moving saw blade. The saw operates in a very rapid manner and requires frequent replacement of the work piece which has contributed to the difficulty in solving the problem of a suitable saw guard which does not interfere with this high speed operation.

The OSHA Act of 1970 has given added impetus to the search for a suitable saw guard in the industry, and the present invention is directed to a saw guard which enables the operator to change the work piece without the danger of his hand or arm coming into contact with the moving saw blade.

Therefore, it is an object of the present invention to provide a saw guard which automatically covers that portion of the saw blade adjacent the operator's hand and arm during the work piece restocking cycle of the machine.

DESCRIPTION OF THE DRAWING

FIG. 1 is a schematic side view of a circular saw and work piece holder with the saw guard in place thereon;

FIG. 2 is a side view of the saw guard mounted on the work piece holder in a shielding position relative to the saw blade taken along lines 2—2 of FIG. 1;

FIG. 3 is a top view of the saw guard shown in a shielding position relative to the saw blade and in a retracted position in dotted line taken along lines 3—3 of FIG. 2; and FIG. 4 is a schematic illustration of the valving mechanism employed in the present invention to actuate the saw guard into and away from a shielding position.

DESCRIPTION OF PREFERRED EMBODIMENTS

The present invention is described relative to a circular saw employed in the shingle industry. However, it is clear that the saw guard may be used to advantage with any saw having a work piece holder moving relative to the saw to move the work piece into contact therewith.

Reference is now made to FIG. 1 in which many of the parts are illustrated schematically since they are well known in the art and form no part of the present invention. In particular, FIG. 1 represents schematically a suitable shingle machine on which the saw guard of the present is useful known as the Sumner Standard (1908) shingle machine. The saw has a stationary machine frame 10 having upper and lower horizontal members 11 and 12, respectively, and vertical frame members 13 and 14. A circular saw blade 15 rotates about a shaft 16 and may be powered by any suitable power source (not illustrated). The saw blade 10 and its shaft 16 may be held in position by any suitable frame members (not illustrated) and is illustrated in FIG. 1 as being behind the stationary machine frame 10.

Mounted in machine frame 10 for reciprocal horizontal motion therealong is a work piece holder or carriage 17 having upper and lower frame members 18 and 19, respectively, and vertical frame members 20 and 21. Vertical frame member 20 is the leading frame member, and vertical frame 21 is the trailing frame member relative to the saw blade. The work piece holder 17 is moved back and forth on machine frame 10 on suitable wheels or rollers 22–25 by suitable means (not illustrated). A work piece 26, which in the preferred embodiment is a cedar block, is held in position in the work piece holder 17 by means of an upper clamping member 27. The bottom of the work piece may be held in a similar clamping member at the bottom (not shown). In the shingle industry the clamping member is an elongated grooved roller which rotates to advance the block outward toward the saw side in increments of a shingle thickness after each pass of the work piece through the saw blade. Since such a mechanism is well known in the art, it has not been illustrated in detail.

The saw guard 30 of the present invention is shown in FIG. 1 attached to the leading vertical frame member 20 in a manner best illustrated by reference to FIG. 2. As shown in FIG. 2, a mounting plate 31 is attached to vertical frame member 20 by means of bolts 32 and 33 located in slots 34 and 35, respectively. Such an arrangement permits the mounting plate 31 to be adjusted inwardly and outwardly so that the saw guard attached thereto may be properly aligned with the saw blade.

Saw guard 30 has a body member 36 which is generally U-shaped in cross section and which, in a shielding position, has its concave surface 37 presented to the saw blade 15 and its convex surface 38 facing away from the saw blade 15. Preferably, the U-shaped body member 36 is made of an easily machinable plastic such as polyurethene. Attached to convex surface 38 are a pair of hinge lugs 39 and 40. Hinge lugs 39 and 40 are attached to arms 41 and 42 by means of pins 43 and 44 so that the body member 36 is pivotable. Arms 41 and 42 are attached to mounting plate 31 by any suitable means such as welding.

Means are provided to move the U-shaped body member 36 into a shielding position adjacent the edge of the saw blade 15 located adjacent the location of the work piece 26, and to retract the U-shaped body member 36 to a position away from the edge of saw blade 15, comprising a fluid actuatable cylinder 45, preferably an air cylinder, having a piston rod 46 extending therefrom. Piston rod 46 has a fork or yoke 47 attached to its outer end. The fork or yoke 47 is attached to a bracket 48 extending from the convex side 38 of U-shaped body member 36 by means of a pin 49 in a manner which permits the fork or yoke 47 to pivot about bracket 48 during extension or retraction of piston rod 46. The opposite end of fluid actuable cylinder 45 is attached to mounting plate 31 by means of a bracket 50 attached to mounting plate 31 and a pin 51 passing through the bracket 50 and a lug 52 extending rearwardly from the fluid actuatable cylinder 45. Such an arrangement permits the cylinder 45 to move about pin 51 during extension and retraction of piston rod 46.

The mechanism which actuates the saw guard into a shielding position and retracts it therefrom is a pair of two-way valves which actuate the fluid cylinder to either extend the piston rod 46 or retract it.

The valve system is illustrated schematically in FIG. 4. A source of fluid under pressure, preferably air, passes through conduit 53 in the direction of the arrow from a source not illustrated. The fluid passes to a first two-way valve 54, which is shown in a position to actuate cylinder 45 to extend piston rod 46 to a position that causes the saw guard to move into a shielding position. Thus, as illustrated in FIG. 4, the fluid passes through first valve 54 into a second conduit 55 and to a second two-way valve 56. Second valve 56 is shown in a position to pass the fluid to a third conduit 57 which enters the cylinder 45 at its rearward portion behind the piston located therein (not illustrated). The fluid entering cylinder 45 thus forces piston rod 46 to extend outwardly and move the U-shaped body member 36 into a shielding position, as shown in FIG. 3.

Reference is made to FIG. 1 to show the actual positions of first valve 54 and second valve 56 on the saw machine. First valve 54 is located on upper horizontal frame member 18 of the work piece holder 17 where, in the noncutting position of work piece holder 17, it is contacted by a stop 58 located on upper clamping member 27 as the clamping member is raised by the operator to restock the work piece holder with a new work piece. Second valve 56 is located on lower horizontal frame member 19 of the work piece holder 17 and is only actuated when it contacts stop 59 located on lower horizontal frame member 12 of machine frame 10.

In operation the operator can stop the horizontal reciprocating motion of work piece holder 17 occurring during the cutting cycle by actuating a clutch mechanism (not shown) and raising clamping member 27 in the vertical direction to thereby permit the operator to place a new work piece 26 into the work piece holder 17. In the noncutting position of the work piece holder 17 second valve 56 is opened to the position illustrated in FIG. 4 by virtue of the fact that it is in contact with stop 59. When the clamping member 27 is raised to the vertical position to permit the operator to insert the new work piece, valve 54 is opened to the position illustrated in FIG. 4 by the action of stop 58 thereby permitting fluid to flow from conduit 53 into conduit 55, through which it passes through second valve 56 and conduit 57 into cylinder 45. This actuates cylinder 45 to extend piston rod 46 and thus move the U-shaped body member 36 of the saw guard 30 into a shielding position, as illustrated in FIGS. 2 and 3.

Upon lowering the clamping member 27, stop 58 no longer acts upon valve 54, and it then operates to shut off the flow of fluid from conduit 53 into conduit 55 and instead shunts it into conduit 60. The flow of fluid from conduit 60 enters the forward end of cylinder 45 ahead of the piston which then forces the piston to retract piston rod 46 and move U-shaped body member 36 from a shielding position into a nonshielding position as shown in phantom view in FIG. 3. Thus, when the work piece holder 17 starts its cycle of moving the work piece through the saw blade, the saw guard is not damaged.

The double valve mechanism prevents accidental actuation of the saw guard into a shielding position since even if the first valve 54 were to be actuated during a cutting stroke, the second valve 56 would be in a closed position and not permit fluid to pass through conduit 57 into cylinder 57.

We claim:

1. A saw machine having a work piece holder which moves the work piece into contact with a moving saw blade by relative motion of the holder and blade during a cutting cycle and which may be opened to replace the work piece during a work piece restocking cycle; a saw guard mounted on the leading edge of the work piece holder, means for holding the guard in a retracted position so that it does not shield the saw blade during said cutting cycle, and means to move the guard into shielding position adjacent the cutting edge of said saw blade during the time when the work piece holder is in said work piece restocking cycle.

2. The apparatus of claim 1 wherein the saw guard has a saw blade shielding body member which is generally U-shaped, means for pivotally holding said body member on the leading edge of said work piece holder, a fluid actuatable cylinder whose piston rod is attached to said body member, and means to actuate said cylinder to extend said cylinder rod and thereby move said body member into shielding position adjacent the cutting edge of the saw blade during the restocking cycle and to retract said cylinder rod and thereby move said body member out of shielding position during the cutting cycle.

3. The apparatus of claim 2 wherein said means to actuate said cylinder comprises a first and second two-way valve means, the first valve having a first position which communicates a source of fluid under pressure with said cylinder at a location which effects retraction of said piston rod, and a second position which communicates said source of fluid with a second valve, said second valve having a first position which communicates said first valve with said cylinder at a location which effects extension of said piston rod and a second location which blocks communication between said first valve and said cylinder, said first valve being in its first position during said cutting cycle and means to actuate it to its second position upon opening of said work piece holder to a work piece receiving position, said second valve being in its second position during the cutting cycle and means to actuate it to its first position when said work piece holder is at its noncutting reach.

4. The apparatus of claim 1 wherein the saw machine is a circular saw of the type used for cutting shingles from a block of wood.

5. A saw machine having a work piece holder which moves the work piece into contact with a moving circular saw blade by motion of the holder past the saw blade during a cutting cycle, said holder having an upper clamping member which may be raised vertically to restock it with a fresh work piece, said work piece holder having vertical and horizontal frame members, a saw guard having a generally U-shaped body member hingedly mounted on a leading frame member, a fluid actuatable cylinder having a piston rod, the piston rod being connected to said U-shaped body member, said cylinder and said U-shaped body member being located in a position such that when said piston rod is fully extended said body member shields the cutting edge of said saw blade adjacent said work piece holder and when fully retracted said body member no longer shields the cutting edge of said saw blade, a first and second valve means and associated actuating means which communicate a source of fluid under pressure with said fluid cylinder at a location to extend said piston rod when the work piece holder is in both a noncutting position and said clamping member is vertically raised to permit restocking, said valve means being actuated by said actuation means to communicate the fluid source with said fluid cylinder at a location to retract said piston rod when said clamping member is lowered to hold the work piece in said work piece holder.

* * * * *